United States Patent [19]

Trimnell et al.

[11] B 3,914,214

[45] Oct. 21, 1975

[54] THIOLATION OF POLYSACCHARIDES

[75] Inventors: Donald Trimnell; Baruch S. Shasha, both of Peoria; William M. Doane, Morton, all of Ill.

[73] Assignee: The United States of America as represented by the Secretary of Agriculture, Washington, D.C.

[22] Filed: Aug. 24, 1973

[21] Appl. No.: 391,184

[44] Published under the Trial Voluntary Protest Program on January 28, 1975 as document no. B 391,184.

[52] U.S. Cl. .......... 260/216; 260/209 D; 260/209 R; 260/212; 260/233.5; 260/234 D; 260/234 R
[51] Int. Cl.². C08B 5/14; C08B 31/06; C08B 37/02
[58] Field of Search .... 260/212, 216, 233.5, 234 D, 260/209 D, 209 R, 234 R

[56] References Cited
UNITED STATES PATENTS

| | | | |
|---|---|---|---|
| 3,007,918 | 11/1961 | Benesch et al. | 260/212 |
| 3,666,738 | 5/1972 | Burke et al. | 260/216 |
| 3,666,739 | 5/1972 | Burke et al. | 260/216 |
| 3,689,466 | 9/1972 | Bridgeford et al. | 260/216 |
| 3,756,966 | 9/1973 | Lamberti | 260/233.5 |

OTHER PUBLICATIONS

Trimnell et al., Carbohyd. Res., 22 (1972) pp. 351–359.

*Primary Examiner*—Ronald W. Griffin
*Attorney, Agent, or Firm*—M. Howard Silverstein; Max D. Hensley; David G. McConnell

[57] ABSTRACT

A method is disclosed which provides for the replacement of polysaccharide —OH groups with —SH groups by pyrolytic degradation of dithiobis(thioformate) polysaccharide derivatives followed by saponification of the resulting dithiocarbonate ester.

7 Claims, No Drawings

THIOLATION OF POLYSACCHARIDES

A nonexclusive, irrevocable, royalty-free license in the invention herein described, throughout the world for all purposes of the United States Government, with the power to grant sublicenses for such purposes, is hereby granted to the Government of the United States of America.

BACKGROUND OF THE INVENTION

This invention relates to a method of preparing thiolated polysaccharides and to intermediate dithiocarbonate derivatives of polysaccharides.

Thiolated polysaccharides have been prepared by several methods. Chaudhuri et al. [J. Polym. Sci. 48: 159–166 (1960)] obtained a thiolated product by the reaction of cellulose with ethylene sulfide, while thiolated dextrans were similarly prepared by Zavoda et al. [Chem. Abstr. 67: 12790d (1967)]. Acetyldeoxythio ethyl cellulose has been reported to be converted to thiols by reaction with sodium methoxide [G. N. Richards, J. Appl. Polym. Sci. 5: 558–562 (1961)], and tosyloxy groups on cellulose have been replaced with -SH groups by sodium or potassium thiolacetates [Schwenker et al., Text. Res. J. 32: 797–804 (1962)]. Ward et al. [J. Appl. Polym. Sci. 13: 607–627 (1969)] disclosed the thiolation of cotton with 1-chloro-2,3-epithiopropane, and the thiolation of aminated cellulose and starches with cyclic thiolesters was disclosed in U.S. Pat. No. 3,007,918. A therapeutic chelating agent was prepared by Jellum et al. [Biochem. Pharmacol. 22: 1179–1188 (1973)] by thiolating aminated dextrans with N-acetyl homocysteine thiolactone.

The above thiol compounds were found to have a variety of uses including the preparation of graft copolymers with properties useful for ion exchange and fire retardancy [see text and references of W. J. Brickman, Tappi 56(3): 97–100 (1973) and U.S. 3,007,918, supra]; the imparting of crease recovery to fabrics (Schwenker et al. and Ward et al., supra); and as chelating agents (U.S. Pat. No. 3,007,918 and Jellum et al., supra).

We have now discovered a new method for preparing thiolated polysaccharides which comprises the following steps:

a. pyrolyzing dithiobis(thioformate) derivatives of polysaccharides having a dithiobis(thioformate) degree of substitution (D.S.) of from 0.02 to 1.5 at a temperature of from about 100° to 200° C.;
b. saponifying the pyrolyzed product resulting from step (a); and
c. neutralizing, recovering, and drying the product resulting from step (b). The dithiobis(thioformate) derivatives of polysaccharides can be easily prepared from the polysaccharide by reacting the polysaccharide, alkali, and carbon disulfide in molar ratios of from 1:0.2:0.2 to 1:12:12 in an aqueous slurry to form the xanthate derivative of the polysaccharides. Then the polysaccharide xanthate derivatives are oxidatively coupled to form the dithiobis(thioformate) derivatives followed by pyrolysis, saponification, and neutralization. In this manner thiols can be prepared in a single comprehensive process beginning with the desired polysaccharides.

The thiolated polysaccharides of this invention are useful as starting materials in the preparation of graft copolymers, as wet- and dry-strength additives in paper, as reinforcing agents in rubber, and as chelating agents. Those skilled in the art will know of other uses for the products prepared by the instant method.

DETAILED DESCRIPTIONS OF THE INVENTION

Thermal degradations of dithiobis(thioformate) derivatives of simple sugars and of cellulose have been reported in the literature. Shasha et al. [Carbohyd. Res. 24:202-206 (1972)] disclosed that the dithiobis(thioformate) derivatives of 1,2:3,4-di-O-isopropylidene-α-D-galactopyranose and 1,2:5,6-di-O-isopropylidene-α-glucofuranose thermally decompose with or without pyridine to give the corresponding dimeric thionocarbonates (i.e.,

ROCOR).

It has also been shown that when simple sugar dithiobis(thioformate) derivatives contain vicinal diol groups, cyclic thionocarbonates are formed, i.e.,

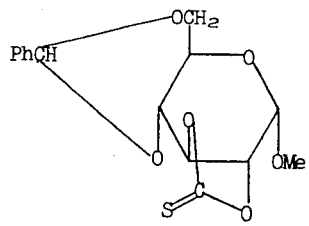

Stout et al., Carbohyd. Res. 3: 354-360 (1967).

Shasha et al. [Carbohyd. Res. 10: 449–455 (1969)] reported that dithiobis(thioformate) groups attached to secondary hydroxyl groups of sugars decompose only to thionocarbonates and not to dithiocarbonates. They explain that the relatively large size of the simple sugar precludes formation of dithiocarbonate. Trimnell et al. [Carbohyd. Res. 22: 351–359 (1972)] reported that certain sterically unhindered primary dithiobis(thioformate) derivatives of methyl substituted glucoses gave the corresponding dithiocarbonates (i.e.,

ROCSR)

upon thermal decomposition in pyridine. However, Polyakov et al. [Vysokomol. Soedin 2: 386–389 (1960)] teaches that thermal decomposition of cellulose dixanthogenide [i.e., cellulose dithiobis (thioformates)] in an inert atmosphere at 160° to 180° C. results in degradations which proceed according to the mechanism proposed by Chugaev [Ber. 32: 3332–3335 (1899)]. That is, an unsaturated cellulose is obtained. Burke et al. (U.S. pat. No. 3,666,739) disclosed that unsaturated celluloses are also obtained from certain esters of cellulose xanthate by thermal decomposition.

We were surprised, therefore, when we found that the heretofore unknown compound, starch dithiocarbonate (i.e.,

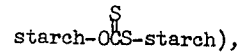

starch-OCS-starch), was obtained along with the corresponding thionocarbonate in various ratios from the pyrolysis of starch dithiobis(thioformate). The dithiocarbonate was not obtained when the thermal decomposition took place in the presence of pyridine. We were also surprised to find that dithiobis(thioformate) derivatives of xylan and dextran, polysaccharides which contain only secondary hydroxyl groups, readily form dithiocarbonates.

The preparation of dithiobis(thioformate) derivatives of polysaccharides begins with the xanthation reaction which is well known in the prior art. Adamek and Purves [Can. J. Chem. 35: 960–968 (1957)] describe a method of xanthating cellulose and starch, but they teach that a xanthate D.S. of over 2 is not expected to be produced. Russell et al. [Tappi 45(7): 557–566 (1962)] describe a method by which starch is xanthated to D.S. levels of from about 0.04 to 1. The method of xanthation used herein is a modification of that described by Russell et al., supra, with which xanthates having D.S. levels of from 0.04 to 3.0 were produced.

Any polysaccharide having free hydroxyl groups is a suitable starting material for the preparation of the dithiobis(thioformate) derivatives from which the thiol derivatives of the instant invention are prepared.

The oxidative conversion of polysaccharide xanthates to the corresponding dithiobis(thioformate) derivatives (i.e., xanthides) is also described by Russell et al., supra. Examples of suitable oxidizing agents include iodine, chlorine, sodium tetrathionate, cyanogen bromide, nitrous acid, nitrosyl chloride, chloramine T, and nitrogen tetroxide.

The thermal degradation (pyrolysis) of dithiobis(thioformate) derivatives of polysaccharides appears to proceed according to the following reaction:

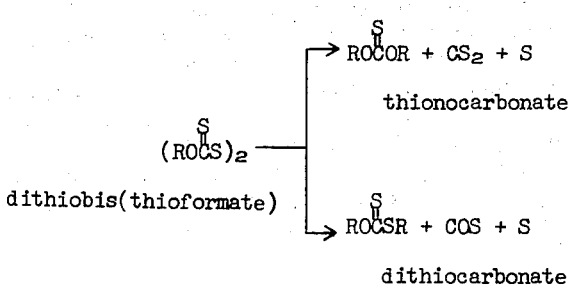

Although the above reaction shows the thionocarbonate and dithiocarbonate as separate compounds, it is more likely that both functional groups exist on the same starch molecule. Thus, the dithiocarbonate can be accurately represented as:

where R = a polysaccharide molecule or the thionocarbonate derivatives of same. Evolution of carbon disulfide indicates a fragmentation-rearrangement of the dithiobis(thioformate) to thionocarbonate and the evolution of carbonyl sulfide indicates a fragmentation-rearrangement to the dithiocarbonate. Both carbon disulfide and carbonyl sulfide, in ratios that vary according to reaction conditions, are evolved when polysaccharide dithiobis(thiocarbonates) are pyrolyzed in accordance with the invention. Upon saponification and neutralization the thionocarbonates revert to the parent polysaccharide —OH group while the dithiocarbonate ester groups are converted to —SH groups. Saponification is defined herein as the reaction of an amount of alkali sufficient to decompose all of the dithiocarbonate, thionocarbonates, and unreacted dithiobis(thioformates) which are present in the pyrolysis reaction mixture. Neutralization is defined herein as adding sufficient acid or base to a reaction mixture to bring the mixture to a pH of about 7.

Starch dithiobis(thioformates) having a dithiobis(thioformate) degree of substitution $(D.S._d)$ of 1.5 (i.e., corresponding to a xanthate D.S. of 3.0) was pyrolyzed. Gases were analyzed as the piperidine complexes by the method described in Trimnell et al., supra.

That formation of dithiocarbonate did occur was further evidenced by infrared (IR) and ultraviolet (UV) spectra. The dithiobis(thioformate) group exhibits broad IR absorption bands near 8.1 and 9.6 $\mu$m. Pyrolysis of this compound at 200° C. for 90 min. gave gases that indicated 77 percent decomposition and the ratio of carbonyl sulfide:carbon disulfide of 1:1. The IR spectrum of the pyrolyzate revealed a weak absorption of 8.1 $\mu$m for residual dithiobis(thioformate) and a new band at 8.4 $\mu$m characteristic for dithiocarbonate. The 8.4 $\mu$m band remained after treatment of the pyrolyzate with p-chlorothiophenol to decompose residual dithiobis(thioformate) but disappeared upon subsequent treatment with base to form the thiol. When a portion of the product after p-chlorothiophenol treatment was digested with $\alpha$-amylase, the UV spectrum showed absorption maximum at 283 nm for dithiocarbonate. Saponification of the pyrolyzed product followed by acetolysis gave a product with absorptions in the IR spectrum at 5.7 $\mu$m for O-acetyl and at 5.9 $\mu$m for S-acetyl. The sulfur content of the acetate was near theory for that expected from the amount of carbonyl sulfide collected during pyrolysis. Moreover, the nuclear magnetic resonance (NMR) spectrum of the acetate revealed the presence of O-acetyl ($\tau$8.0) and S-acetyl ($\tau$7.7) absorptions in a ratio which agreed well with that expected from the sulfur content. When the saponification-acetylation procedures were repeated with unpyrolyzed starch dithiobis(thioformate), the product showed only O-acetyl by IR and contained no sulfur. Treatment of the pyrolyzed-saponified product with Ellman's reagent [5,5'-dithiobis(2-nitrobenzoic acid)] revealed the presence of thiol. This procedure is very sensitive and can detect thiol groups in starch with a D.S. as low as 0.01.

Products prepared from starch xanthates having xanthate D.S. from 0.04 to 3.0 gave similar results upon analysis.

Temperature of pyrolysis has some effect on the products. At 200° C. decomposition is complete or nearly so, but at 125° C. gas evolution indicated only a 20 percent decomposition.

Substances which are possibly occluded in the dithiobis(thioformate) during its preparation include sodium sulfate, sodium acetate, sodium nitrate, and water. Sodium sulfate partially retards the formation of dithiocarbonates during pyrolysis, but sodium acetate, sodium nitrate, and water accelerate the formation of dithiocarbonates.

The basic reaction scheme comprises the pyrolysis of the dithiobis(thioformate) derivatives and the saponification and neutralization of the products. However, it may be preferable at times to begin with the unreacted polysaccharide, prepare the xanthate, oxidatively couple the xanthate to form the diathiobis(thioformate), pyrolyze the dithiobis(thioformate), and saponify the pyrolysis product is situ. This scheme can be accomplished without recovery of any intermediates. Xanthation and oxidative coupling were easily accomplished in an aqueous medium. Pyrolysis also readily took place in water at about 100°, and as it is shown above, occluded salts can be present without detriment to the pyrolysis reaction. In the examples, infra, each intermediate was recovered from its reaction medium for purposes of analysis.

The following examples are intended only to further illustrate the invention and should not be construed as limiting the scope of the invention as defined in the claims.

Preparation of Dithiobis(thioformate) Derivatives of Starch.

Starch, 5 g. (reaction No. A-G) or 10 g. (reaction No. H-J), 20–50 ml. water, and 5–20 g. of potassium hydroxide were rapidly agitated to form a smooth paste. Carbon disulfide, 20 ml. (25.26 g.) was added, the mixture agitated slowly for 3 hr. at room temperature, and diluted with ice water to 500 ml. Sodium nitrite, 6.5–13 g., was added and the solution flushed with nitrogen and stirred, while 14–42 ml. of 5N acetic acid and from 30–500 ml. of 2N sulfuric acid were slowly added. For purposes of analysis, the resulting precipitate was filtered, washed with water, acetone, carbon disulfide, and hexane. The products were analyzed for percent S by the standard Schöniger method, see Table 1.

EXAMPLES 1–7

Starch dithiobis(thioformate) samples G through J above were each pyrolyzed in the dry state in flasks equipped with stirrers and gas inlet and outlet tubes. During pyrolysis, a slow stream of nitrogen was passed into the flask and out through a calcium chloride tube into a solution of 1 percent piperidine in hexane cooled to 5° C. The temperature of the material being pyrolyzed reached the temperature of the bath within 5 min. The bath was varied from 125° to 175° C. controlled to ± 5° C. The solid that formed in the piperidinehexane solution was filtered and weighed to determine the total amount of carbonyl sulfide and carbon disulfide evolved. The ratio of the two gases was determined from IR spectra of the solid dissolved in chloroform in accordance with the method described by Trimnell et al., supra. The weight of the piperidine complex was used to determine percent decomposition, and D.S. of dithiocarbonate and final thiol product was calculated from the carbonyl sulfide.

The pyrolyzed products (1 g.) were then treated with 10 ml. of 12.5N sodium hydroxide for 15 min. at room temperature to decompose all of the thionocarbonate, dithiocarbonate, and unreacted dithiobis(thioformate). The resulting products were neutralized with acetic acid 20 ml.), cooled, diluted with methanol (30 ml.), and filtered. The neutralized products were then washed with carbon disulfide and chloroform to remove elemental sulfur and dried, Table 2.

Table 1

| Reaction No. | St., g. | (thioformate) CS$_2$, ml. | KOH, g | NaNO$_2$, g | Acetic acid, 2N, ml. | H$_2$SO$_4$, 2N, ml. | H$_2$O, ml. | % S | Dithiobis- D.S.$_d^1$ | Yield, g. |
|---|---|---|---|---|---|---|---|---|---|---|
| A | 5 | 20 | 5 | 6.5 | 14 | 30 | 50 | 28.4 | 0.5 | 6.9 |
| B | 5 | 20 | 5 | 6.5 | 14 | 30 | 20 | 32.0 | 0.6 | 7.6 |
| C | 5 | 20 | 10 | 6.5 | 28 | 250 | 50 | 37.1 | 0.8 | 7.8 |
| D | 5 | 20 | 10 | 6.5 | 28 | 50 | 25 | 39.6 | 0.9 | 8.3 |
| E | 5 | 20 | 15 | 10.0 | 42 | 375 | 50 | 46.9 | 1.3 | 8.6 |
| F | 5 | 20 | 20 | 13.0 | 20 | 500 | 50 | 48.9 | 1.5 | 8.9 |
| G | 10 | 40 | 2.5 | 4.7 | 7 | 75 | 100 | 9.3 | 0.1 | 12.0 |
| H | 10 | 40 | 5.0 | 6.8 | 14 | 75 | 100 | 14.6 | 0.2 | 13.7 |
| I | 10 | 40 | 7.5 | 9.7 | 21 | 75 | 100 | 18.1 | 0.3 | 15.5 |
| J | 10 | 40 | 10.0 | 13.0 | 28 | 100 | 100 | 25.8 | 0.5 | 14.6 |

$^1$D.S.$_d$ = dithiobis(thioformate); D.S. = one-half xanthate D.S. based on percent sulfur.

Table 2

| Example | Reaction No. | D.S.$_d$ | Temp., °C. | Time, min. | Decomp., % | % COS | D.S.$_t^1$ |
|---|---|---|---|---|---|---|---|
| 1 | G | 0.13 | 150 | 40 | 44 | 30 | 0.02 |
| 2 | H | 0.23 | 150 | 40 | 54 | 30 | 0.04 |
| 3 | I | 0.30 | 150 | 40 | 58 | 40 | 0.07 |
| 4 | J | 0.50 | 125 | 30 | 18 | 20 | 0.02 |
| 5 | J | 0.50 | 130 | 60 | 62 | 20 | 0.06 |
| 6 | J | 0.50 | 150 | 40 | 78 | 20 | 0.08 |
| 7 | J | 0.50 | 175 | 20 | 91 | 20 | 0.10 |

$^1$D.S.$_t$ = D.S. of thiol calculated from COS analysis.

EXAMPLES 8–13

Starch dithiobis(thioformate) samples A through F (0.9 g.) were pyrolyzed in an oven at 190° C. for 15 min. (sample F was pyrolyzed for 30 min.). Each pyrolyzed sample was then stirred for 15 min. at room temperature with 10 ml. of 12.5N sodium hydroxide, diluted with 10 ml. of water, and neutralized with 20 ml. of glacial acetic acid. The neutralized products were diluted with 30 ml. methanol, cooled, filtered, and washed with carbon disulfide and chloroform. The starch thiols were then analyzed for sulfur, Table 3.

Table 3

| Example | Reaction No. | Starch thiols Yield, % | % S | D.S.$_t$ |
|---|---|---|---|---|
| 8 | A | 44 | 3.1 | 0.08 |
| 9 | B | 38 | 4.2 | 0.12 |
| 10 | C | 22 | 3.9 | 0.10 |
| 11 | D | 39 | 4.1 | 0.12 |
| 12 | E | 45 | 4.4 | 0.12 |
| 13 | F | 45 | 7.0 | 0.22 |

EXAMPLE 14

Xylan (2.5 g.) was dispersed in 25 ml. of water and treated with 2.5 g. of potassium hydroxide and 10 ml. of carbon disulfide for 3 hr., then oxidized with sodium nitrite as in Example 1 to yield 3.2 g. of the dithiobis(thioformate) percent S, 20.4. Pyrolysis (150° C., 40 min.) and saponification performed as in Examples 1–7 resulted in 34 percent decomposition with 3:7 carbonyl sulfide:carbon disulfide, thiol D.S. 0.02.

EXAMPLE 15

Dextran (5 g.) in 50 ml. water was treated 4 hr. with 25 g. potassium hydroxide and 10 ml. carbon disulfide, and the resulting products oxidized with 12 g. of sodium nitrite as in Example 1 to yield 7 g. dithiobis(thioformate) percent S, 17.7. Pyrolysis (150° C., 70 min.) and saponification performed as in Examples 1–7 resulted in 36 percent decomposition with 3:7 carbonyl sulfide:carbon disulfide, thiol D.S. 0.02.

EXAMPLE 16

Cotton (15 g., 40 mesh) in 50 ml. water was treated 3 hr. with 5 g. potassium hydroxide and 20 ml. carbon disulfide, and the resulting product oxidized with 6.5 g. sodium nitrite as in Example 1 to yield 6.1 g. dithiobis(thioformate) percent S, 10.9. Pyrolysis (150° C., 40 min.) and saponification performed as in Examples 1–7 resulted in 100 percent decomposition with 1:4 carbonyl sulfide:carbon disulfide, thiol D.S. 0.05.

EXAMPLE 17

Starch dithiobis(thioformate) with a D.S.$_d$ of 0.5 was pyrolyzed as in Examples 1–7 at temperatures of from 125°–175° and analyzed for percent decomposition at various times of reaction, Table 4.

Table 4

| Time, min. | % Decomposition 125° | 130° | 150° | 175° |
|---|---|---|---|---|
| 5 | — | — | 32.5 | 41.5 |
| 10 | 14.0 | 20.5 | 54.0 | 70.0 |
| 20 | — | 41.0 | 67.5 | 91.0 |
| 30 | 17.5 | 51.0 | — | — |
| 40 | — | — | 78.5 | — |
| 60 | — | 61.5 | — | — |

EXAMPLE 18

Dithiobis(thioformates) with D.S.$_d$ of 0.14, 0.23, 0.30, and 0.5 were pyrolyzed at 150° C. as in Examples 1–7 and analyzed at various times for percent decomposition, Table 5.

Table 5

| Time, min. | % Decomposition at various D.S.$_d$ 0.13 | 0.23 | 0.30 | 0.50 |
|---|---|---|---|---|
| 5 | — | — | — | 37.0 |
| 10 | 36.0 | 45.5 | 44.0 | 54.0 |
| 20 | — | — | — | 66.5 |
| 40 | 44.5 | 53.5 | 58.5 | 78.0 |

EXAMPLE 19

Dithiobis(thioformate) (1 g.) with a D.S.$_d$ of 0.13 was pyrolyzed in the presence of 14 mg. sodium sulfate, 15 mg. sodium nitrite, 15 mg. sodium acetate or 500 mg. water at 150° C. as in Examples 1–7 and analyzed for percent decomposition, Table 6.

Table 6

| Time, min. | % Decomposition with Control | $Na_2SO_4$ | $NaNO_2$ | $NaC_2H_3O_2$ | $H_2O$ |
|---|---|---|---|---|---|
| 10 | 36.0 | 20.5 | 38.5 | 48.5 | 47.0 |
| 40 | 44.5 | 24.0 | 45.0 | 58.5 | 53.5 |

EXAMPLE 20

Dithiobis(thioformate) with a D.S.$_d$ of 0.62 was suspended in 72.5 ml. of pyridine and pyrolyzed for 3.5 hr. at 65° C. resulting in 62 percent decomposition with 1:9 carbonyl sulfide:carbon disulfide. IR analysis showed the presence of thionocarbonate but not the presence of dithiocarbonate.

We claim:

1. A method of preparing thiolated polysaccharides comprising the following steps:
    a. pyrolyzing pyridine-free dithiobis(thioformate derivatives of polysaccharides having a dithiobis(thioformate) degree of substitution of from 0.02 to 1.5 at a temperature of from 100° to 200° C.;
    b. saponifying the pyrolyzed product resulting from step (a); and
    c. neutralizing, recovering, and drying the saponified product resulting from step (b).

2. A method of preparing thiolated polysaccharides as defined in claim 1 wherein the dithiobis(thioformate) derivatives of polysaccharides are selected from the group consisting of dithiobis(thioformate) derivatives of starch, dextran, xylan, and cellulose.

3. A method of preparing thiolated polysaccharides as defined in claim 1 wherein the step of pyrolyzing is conducted with the dithiobis(thioformate) derivatives of polysaccharides in a dry state.

4. A method of preparing thiolated polysaccharides as defined in claim 1 wherein the step of pyrolyzing is conducted with the dithiobis(thioformate) derivatives of polysaccharides dispersed in water.

5. A method of preparing thiolated polysaccharides comprising the following steps:
    a. reacting a polysaccharide, having free hydroxyl groups, alkali, and carbon disulfide in molar ratios of from 1:0.2:0.2 to 1:12:12 in an aqueous slurry to form a xanthate derivative of said polysaccharide;

b. oxidatively coupling the polysaccharide xanthate derivative to form a dithiobis(thioformate) derivative of said polysaccharide;
c. pyrolyzing the polysaccharide dithiobis(thioformate) derivative at a temperature of from about 100° to 200° C.;
d. saponifying the pyrolyzed product resulting from step (c); and
e. neutralizing, recovering, and drying the saponified product resulting from step (d).

6. Dithiocarbonate derivatives of polysaccharides comprising the following structure:

$$RO\overset{S}{\underset{\|}{C}}SR$$

where R = a polysaccharide molecule or the thionocarbonate derivative of same.

7. Dithiocarbonate derivatives of polysaccharides as defined in claim 6 wherein the polysaccharide is selected from the group consisting of starch, dextran, xylan, and cellulose.

* * * * *